United States Patent [19]
Okisaki et al.

[11] Patent Number: 5,810,914
[45] Date of Patent: Sep. 22, 1998

[54] FLAME-RETARDANT ENGINEERING PLASTIC COMPOSITION

[75] Inventors: Fumio Okisaki, Yokkaichi; Akinori Hamada, Hofu; Masahiro Obasa, Shinnanyo, all of Japan

[73] Assignee: Tosoh Corporation, Japan

[21] Appl. No.: 813,206

[22] Filed: Mar. 7, 1997

[30] Foreign Application Priority Data

Mar. 8, 1996 [JP] Japan ................... 8-051699

[51] Int. Cl.$^6$ .............. C08K 3/32; C08K 5/49
[52] U.S. Cl. ................. 106/18.14; 106/18.18; 252/609; 428/920; 428/921; 524/115; 524/414; 524/415; 524/416; 524/417; 524/495; 524/496
[58] Field of Search ............ 106/18.14, 18.18; 524/115, 414, 415, 416, 417, 495, 496; 252/609; 428/920, 921

[56] References Cited

U.S. PATENT DOCUMENTS 5,382,387  1/1995  Von Bonin ............ 106/18.14

FOREIGN PATENT DOCUMENTS 1-286909  11/1989  Japan ................ 106/18.14

OTHER PUBLICATIONS

Chemical Abstract No. 84:31990 which is an abstract of Great Britain Patent Specification No. 14004822, Sep. 1975.
Chemical Abstract No. 85:79088 which is an abstract of French Patent Specification No. 2276334, Jan. 1976.
Chemical Abstract No. 85:95312 which is an abstract of Netherlands Patent Specification No. 7408257, Dec. 1975.
Chemical Abstract No. 96:7770 which is an abstract of Japanese Patent Specification No. 56–095941, Aug. 1981.
Chemical Abstract No. 119:272917 which is an abstract of German Patent Specification No. 4135678, May, 1993.
Chemical Abstract No. 125:88701 which is an abstract of Japanese Patent Specification No. 08–085189, Apr., 1996.
WPIDS Abstract No. 89–047840 which is an abstract of European Patent Specification No. 302987, Feb., 1989.
WPIDS Abstract No. 90–351944 which is an abstract of Japanese Patent Specification No. 02–253936, Oct., 1990.
WPIDS Abstract No. 95–203956 which is an abstract of Japanese Patent Specification No. 07–118435, May, 1995.
WPIDS Abstract No. 95–380195 which is an abstract of Japanese Patent Specification No. 07–258477, Oct., 1995.
WPIDS Abstract No. 96–112811 which is an abstract of Japanese Patent Specification No. 08–012805, Jan., 1996.
WPIDS Abstract No. 96–319056 which is an abstract of Japanese Patent Specification No. 08–143715, Jun., 1996.
WPIDS Abstract No. 96–422083 which is an abstract of Japanese Patent Specification No. 08–208875, Aug., 1996.
WPIDS Abstract No. 96–499719 which is an abstract of Great Britain Patent Specification No. 2300860, Nov., 1996.
WPIDS Abstract No. 96–502858 which is an abstract of Japanese Patent Specification No. 08–259794, Oct., 1996.
WPIDS Abstract No. 97–038062 which is an abstract of Japanese Patent Specification No. 08–295753, Nov., 1996.
WPIDS Abstract No. 97–241848 which is an abstract of Japanese Patent Specification No. 09–077894, Mar., 1997.
WPIDS Abstract No. 97–295090 which is an abstract of Japanese Patent Specification No. 09–111059, Apr., 1997.

*Primary Examiner*—Anthony Green
*Attorney, Agent, or Firm*—Nixon & Vanderhye

[57] ABSTRACT

A flame-retardant engineering plastic composition comprising (A) 100 parts by weight of an engineering plastic, (B) from 1 to 30 parts by weight of a heat-expandable graphite, and (C) from 1 to 30 parts by weight of red phosphorus and/or (D) from 1 to 30 parts by weight of a phosphorus compound.

8 Claims, No Drawings

FLAME-RETARDANT ENGINEERING PLASTIC COMPOSITION

The present invention relates to a flame-retardant engineering plastic material which has excellent flame-retardancy and whereby generation of smoke or corrosive gas is suppressed at the time of combustion.

To prevent an outbreak of a fire or the spread of a fire, it is desired, or in many cases obligatory, to impart flame retardancy to engineering plastic materials which are useful as enclosures or internal parts for electric, electronic or office appliances or instruments, interior materials for vehicles, construction materials, etc. To impart flame retardancy to resin materials, it has heretofore been proposed to use flame retardants such as a halogen type flame retardant, magnesium hydroxide, aluminum hydroxide, red phosphorus and a phosphorus compound. However, such flame retardants have had the following problems and are not fully satisfactory.

For example, a halogen type flame retardant has a drawback that it generates a substantial amount of soot and smoke, although it is capable of accomplishing a high degree of flame retardancy (at a level of e.g. UL-94 V-0, V-1, V-2 or the like) with a relatively small amount of its incorporation. Further, it generates an acidic substance such as hydrogen halide more or less when heated during the processing of the resin composition or at the time of a fire, whereby corrosion of the processing instruments or adverse effects to human or instruments at the fire site, are feared.

A metal hydroxide such as magnesium hydroxide or aluminum hydroxide is free from generation of smoke or corrosive gas, but it is required to be incorporated in a large amount. Accordingly, it is likely to impair the excellent characteristic of the resin such as the mechanical strength or light weight.

A phosphorus type flame retardant such as red phosphorus or a phosphoric acid ester generates a substantial amount of smoke, although it provides excellent flame retardancy with a small amount to an engineering plastic such as polyamide, polyester or polycarbonate.

Under these circumstances, a flame retardant which contains no halogen and generates no substantial smoke or corrosive gas and which is effective in a small amount, is desired for engineering plastics. As a candidate, a nitrogen-containing flame retardant such as a melamine or cyanuric acid has been proposed. For example, JP-A-51-54655 discloses that high flame retardancy can be accomplished by incorporating a small amount of melamine cyanurate to a polyamide resin. Further, JP-A-52-108452 discloses that high flame retardancy can be accomplished by incorporating melamine and a condensate of a thiophosphoric acid derivative with thiourea to a polyester resin. However, these retardants tend to bleed out on the resin surface, and they generate corrosive gas and a substantial amount of smoke.

Under these circumstances, the present inventors have conducted an extensive research and as a result, have found that a remarkable flame retarding effect, low smoke generation and low corrosion can be attained for an engineering plastic composition by incorporating a heat-expandable graphite having a specific expandability and a specific particle size, and red phosphate and/or a phosphorus compound, and that a specific phosphorus compound provides a synergistic effect to the heat-expandable graphite. The present invention has been accomplished on the basis of these discoveries.

That it, the present invention provides a flame-retardant engineering plastic composition comprising (A) 100 parts by weight of an engineering plastic, (B) from 1 to 30 parts by weight of a heat-expandable graphite, and (C) from 1 to 30 parts by weight of red phosphorus and/or (D) from 1 to 30 parts by weight of a phosphorus compound.

Now, the present invention will be described in detail with reference to the preferred embodiments.

Component A in the present invention is an engineering plastic, which may, for example, be a polyester resin, a polyamide resin, a polycarbonate resin or a modified polyphenylene oxide resin.

The present invention is not limited to a case where the above engineering plastics are used alone, but two or more of them may be used in combination, or they may be mixed with other polymers, depending upon the required physical properties of the resin.

In the present invention, the polyester resin is a polymer material obtained by e.g. polycondensation of a polybasic acid with a polyhydric alcohol, which may, for example, be a polybutylene terephthalate resin or a polyethylene terephthalate resin.

In the present invention, a polyamide resin is a linear polymer material having amide groups in its molecule, which may, for example, be nylon 6, nylon 66, nylon 11, nylon 12 or nylon 46.

In the present invention, a polycarbonate resin is a polymer material involving carbonate linkage (—O—CO—O—). Polycarbonate can be prepared, for example, by polycondensation of diol with phosgene, with dialkyl carbonate or diaryl carbonate. As a diol, both aliphatic and aromatic diols are used for the monomers of polycarbonates. As an aromatic diol, 2,2-bis(4-hydroxypyhenyl)propane (bisphenol A), bis(4-hydroxyphenyl)sulfone (bisphenol S), 2,2-bis(4-hydroxyphenyl)methane (bisphenol F) are such examples.

In the present invention, a modified polyphenylene oxide resin is a polymer alloy of polyphenylene oxide and other thermoplastic or thermosetting resins as a modifier. As for the polyphenylene oxide, poly(oxy-2,6-dimethyl 1,4-phenylene) is one of such example. Polystyrenes, acrylonitrile-butadiene-styrene terpolymers, polyamides are the examples of thermoplastics as modifiers. Elastomer-modified polystyrene (high-impact polystyrene) can be used as a modifier of polyphenylene oxide preferably.

In the present invention, component B is a heat-expandable graphite. The heat-expandable graphite is a material derived from natural graphite or artificial graphite, which has a characteristic such that it expands in the direction of c-axis of a crystal when heated rapidly from room temperature to a level of from 800° to 1,000° C. and the difference in the specific volume between before and after the rapid heating is at least 100 ml/g. With the one which does not have an expandability of at least 100 ml/g, the flame retardancy is substantially small as compared with the one having an expandability of at least 100 ml/g. In the present invention, the expansibility means the difference between the specific volume (ml/g) after heating and the specific volume at room temperature.

The expandability is measured specifically as follows. A quartz beaker is heated preliminarily to 1,000° C. in an electric furnace. Two grams of heat-expandable graphite is introduced into this quartz beaker quickly, and the quartz beaker is placed immediately in the electric furnace for 10 seconds to cause expansion of the graphite. The weight of 100 ml of the expanded graphite is measured to obtain the loosened apparent specific gravity (g/ml).

[Specific volume] = 1/[Loosened apparent specific gravity]

Separately, the specific volume of the unheated heat-expandable graphite is obtained at room temperature similarly.

[Expandability] =

[Specific volume after heating] − [Specific volume at room temperature]

The heat-expandable graphite of the present invention expands by heating only in the c-axis direction, but expands little in the a-axis direction and the b-axis direction according to electron microscopical observation.

The method for producing the heat expansive graphite of the present invention is not particularly limited. However, it can be prepared, for example, by subjecting natural graphite or artificial graphite to oxidation treatment. As such oxidation treatment, electrolytic oxidation in sulfuric acid or treatment with an oxidizing agent such as phosphoric acid and nitric acid, sulfuric acid and nitric acid or hydrogen peroxide, may, for example, be mentioned. However, as mentioned above, there is no particular restriction as to the method for preparing the heat-expandable graphite in the present invention.

The particle size of the heat-expandable graphite of the present invention affects the fire retardancy of the resulting polymer composition. The graphite of a preferred particle size distribution contains the particles passing through a 80-mesh sieve at a content of 20% or lower by weight, more preferably from 1% to 20% by weight. The graphite which contains the particles passing through a 80-mesh sieve at a content of higher than 20% by weight will not give sufficient fire retardancy, while the graphite containing the above particles at a content of lower than 1% by weight would slightly impair the shape-retaining properties of the resin composition when the resin composition is exposed to fire.

As mentioned above, the heat-expandable graphite preferably has a particle size larger than a certain level. In order to suppress deterioration of the physical properties of the engineering plastic composition by incorporation of large particles, it is also preferred to treat the surface of the heat-expandable graphite with a silane coupling agent or a titanate coupling agent.

As mentioned above, the heat-expandable graphite is prepared by oxidation treatment in sulfuric acid, whereby it tends to have a certain level of acidity depending upon the production conditions. In such a case, it is possible to prevent corrosion of apparatus during the preparation and processing of the engineering plastic composition by permitting co-existence of an alkaline substance such as magnesium hydroxide. Such an alkaline substance is preferably present in the vicinity of the heat-expandable graphite. Accordingly, it is preferred that such an alkaline substance is preliminarily mixed with the heat-expandable graphite to deposit it on the surface of the heat-expandable graphite particles. It is sufficient to incorporate the alkaline substance in an amount of less than 10 wt % to the heat-expandable graphite.

Component C in the present invention is red phosphorus. The red phosphorus is preferably the one which is surface-treated with one or more compounds selected from the group consisting of thermosetting resins and inorganic compounds, from the viewpoint of safety in its handling. The thermosetting resins are not particularly limited and include, for example, phenol resins and melamine resins as preferred examples. The inorganic compounds are not particularly limited and include, for example, hydroxides or oxides of e.g. magnesium, aluminum, nickel, iron, cobalt, etc. as preferred examples.

The red phosphorus is used in an amount of from 1 to 30 parts by weight per 100 parts by weight of the engineering plastic. If the amount is less than 1 part by weight, the flame retarding effect is not sufficient. On the other hand, if it exceeds 30 parts by weight, no substantial increase in the flame retarding effect can be expected.

Component D in the present invention is a phosphorus compound.

The phosphorus compound is not particularly limited so long as it has a synergistic effect with the heat-expandable graphite and an effect for suppressing smoke generation. It may, for example, be an ester of a phosphorus oxyacid (hereinafter referred to simply as "a phosphoric acid"), a phosphoric acid salt, a salt of a phosphoric acid ester or a condensed phosphoric acid salt. Among them, one containing nitrogen has a high flame retarding performance. Specifically, nitrogen-containing phosphoric acid salts such as ammonium polyphosphate, a melamine-modified ammonium polyphosphate, melamine polyphosphate and melamine phosphate, may, for example, be mentioned. Most preferred among them is ammonium polyphosphate, since it has a high phosphorus content. In an application where water resistance is required, it is particularly preferred to employ ammonium polyphosphate having its surface coated with a resin such as a melamine resin, a urea resin or a phenol resin.

The phosphorus compound is incorporated in an amount of from 1 to 30 parts by weight per 100 parts by weight of the engineering plastic. If the amount is less than 1 part by weight, the flame retarding effect is not sufficient. On the other hand, if it exceeds 30 parts by weight, no substantial increase in the flame retarding effect can be expected.

To the resin composition of the present invention, other flame retardants may be incorporated within a range not to impair the effects of the present invention. Further, various additives such as inorganic fillers, coloring agents, antioxidants, photostabilizers, light absorbers and nucleating agents, may be incorporated as the case requires.

By the flame-redarding technique of the present invention as described above, a flame-retardant engineering plastic composition will be provided which contains no halogen and which is provided with a high level of flame retardancy and whereby generation of smoke or corrosive gas can be suppressed.

Now, the present invention will be described in further detail with reference to Examples to make the effects of the present invention clear. However, it should be understood that the present invention is by no means restricted to such specific Examples.

In the following Examples and Comparative Examples, the following materials were used as starting materials.

Component A (A1): Polybutylene terephthalate resin (Novadowool 5010, manufactured by Mitsubishi Chemical Corporation)

(A2): Polyethylene terephthalate resin (Novapet 6010G, manufactured by Mitsubishi Chemical Corporation)

(A3): nylon 6 (Amilane CM1007, manufactured by Toray Industries, Inc.)

(A4): nylon 66 (Amilane CM3001-N, manufactured by Toray Industries, Inc.)

(A5): polycarbonate (Panlite L 1250, manufactured by Teijin Chemical Ltd.)

(A6): polystyrene-modified polyphenylene oxide (Upiace AH 40, manufactured by Mitsubishi Gas Chemical Co. Ltd.)

Component B (B1) Heat-expandable graphite A (CA-60, manufactured by Chuo Kasei K.K.)

(B2) Heat-expandable graphite B (sieved and pulverized CA-60)

(B3) Heat-expandable graphite C (sieved and pulverized CA-60)

The expandabilities and the particle size distributions of B1 to B3 are shown in Table 1.

TABLE 1

|  | Expandability[1] (mg/l) | Particle size distribution[2] (wt %) |
|---|---|---|
| Heat-expandable graphite A | 210 | 5.0 |
| Heat-expandable graphite B | 71 | 5.0 |
| Heat-expandable graphite C | 225 | 27.0 |

[1]The difference in the specific volume between before and after the rapid heating from room temperature to a level of from 800 to 1,000° C.
[2]Weight fraction of particles passing through a 80 mesh sieve.

Component C (C1): Surface treated red phosphorus (Novared 120, manufactured by Rinkagaku Kogyo Co. Ltd.)

Component D (D1): Ammonium polyphosphate surface-treated with a melamine resin (Novawhite, Rinkagaku Kogyo Co. Ltd.)
(D2): Ammonium polyphosphate with no surface treatment (Novawhite, Rinkagaku Kogyo Co. Ltd.)

Component E (Bromine Type Flame Retardant)
(E1): A mixture of a brominated phenoxy resin (EBR107, manufactured by Manac Corporation) and antimony trioxide (Flamecut 610R, manufactured by Tosoh Corporation) in a weight ratio of 2/1.

(E2): A mixture of a brominated polystyrene (Pyrocheck 68PB, manufactured by Nissan Ferro K.K.) and antimony pentoxide (Sunepoc NA-1030, manufactured by Nissan Chemical Co., Ltd.) in a weight ratio of 5/1.

(E3): A mixture of a brominated polystyrene (Pyrocheck 68PB, manufactured by Nissan Ferro K.K.) and antimony trioxide (Flamecut 610R, manufactured by Tosoh Corporation) in a weight ratio of 3/1.

EXAMPLES 1 TO 7 AND COMPARATIVE EXAMPLES 1 TO 11

In the case of the polybutylene terephthalate resin, materials in the blend ratios as identified in Table 2, were extrusion-kneaded at 235° C. and injection-molded at 235° C. to obtain a test specimen. In the case of the polyethylene terephthalate resin, materials in the blend ratios as shown in Table 2 were extrusion-kneaded at 260° C. and injection-molded at 260° C. to obtain a test specimen. The flame retardancies were evaluated by an oxygen index (hereinafter referred to simply as OI) in accordance with JIS K 7201 and UL 94 vertical burning test specification ($\frac{1}{16}$ inch thickness). The smoke emission measurements were conducted according to ASTM E 662 (flaming condition). The results are shown in Table 2.

TABLE 2

| Example No. | Component A | Component B | (phr) | Component C | (phr) | Component D | (phr) | Component E | (phr) | UL 94 | OI (%) | Dmax |
|---|---|---|---|---|---|---|---|---|---|---|---|---|
| Example 1 | A1 | B1 | 10 | C1 | 5 | | | | | V-0 | 34.5 | 205 |
| Example 2 | A1 | B1 | 9 | | | D1 | 6 | | | V-1 | 29.5 | 185 |
| Example 3 | A1 | B1 | 15 | | | D1 | 10 | | | V-0 | 33.3 | 164 |
| Example 4 | A1 | B1 | 9 | C1 | 2 | D1 | 4 | | | V-0 | 33.3 | 197 |
| Example 5 | A2 | B1 | 3 | C1 | 2 | | | | | V-0 | 34.5 | 251 |
| Example 6 | A2 | B1 | 3 | | | D2 | 2 | | | V-1 | 30.1 | 236 |
| Example 7 | A2 | B1 | 6 | | | D2 | 4 | | | V-0 | 34.5 | 224 |
| Comparative Example 1 | A1 | B1 | 15 | | | | | | | Fail | 32.0 | 345 |
| Comparative Example 2 | A1 | | | C1 | 15 | | | | | V-2 | 24.0 | 408 |
| Comparative Example 3 | A1 | | | | | D1 | 15 | | | V-2 | 23.0 | 355 |
| Comparative Example 4 | A1 | | | | | D1 | 25 | | | V-2 | 23.4 | 370 |
| Comparative Example 5 | A1 | B2 | 10 | C1 | 5 | | | | | Fail | 28.6 | 461 |
| Comparative Example 6 | A1 | B3 | 10 | C1 | 5 | | | | | Fail | 28.2 | 475 |
| Comparative Example 7 | A1 | | | | | | | E1 | 30 | V-0 | 30.3 | 500> |
| Comparative Example 8 | A2 | B1 | 5 | | | | | | | Fail | 32.0 | 345 |
| Comparative Example 9 | A2 | | | C1 | 5 | | | | | V-2 | 24.0 | 408 |
| Comparative Example 10 | A2 | | | | | D2 | 5 | | | V-2 | 23.0 | 355 |
| Comparative Example 11 | A2 | | | | | | | E2 | 20 | V-0 | 38.3 | 500> |

Firstly, the case where the polybutylene terephthalate resin (A1) was used as the polyester resin (Component A), will be described. As is evident from Comparative Example 1, Comparative Example 2 and Comparative Examples 3 and 4 in Table 2, when the heat-expandable graphite (Component B), the red phosphorus (Component C) or the ammonium polyphosphate (Component D) was used alone, improvement in OI or UL-94 was small. However, as shown in Examples 1 to 4, synergistic effects are apparent such that a high level of flame retardancy can be accomplished with respect to the polybutylene terephthalate resin by a combined use of Components B and C, Components B and D, or Components B, C and D. Further, from comparison of Example 1 and Comparative Examples 5 and 6 in Table 2, the effect of incorporating the heat-expandable graphite (B1) having an expandability of 200 ml/g wherein particles

EXAMPLES 8 TO 13 AND COMPARATIVE EXAMPLES 12 TO 21

In the case of the nylon 6 resin, materials in the blend ratios as shown in Table 3 were extrusion-kneaded at 235° C. and injection-molded at 235° C. to obtain a test specimen. In the case of the nylon 66 resin, materials in the blend ratios as shown in Table 3 were extrusion-kneaded at 285° C. and injection-molded at 285° C. to obtain a test specimen. The flame retardancies and the smoke emission levels were evaluated similarly to Examples 1 to 7 and Comparative Examples 1 to 11. The results are shown in Table 3.

TABLE 3

| Example No. | Component A | Component B (phr) | | Component C (phr) | | Component D (phr) | | Component E (phr) | | UL 94 | OI (%) | Dmax |
|---|---|---|---|---|---|---|---|---|---|---|---|---|
| Example 8 | A3 | B1 | 3 | C1 | 2 | | | | | V-0 | 32.1 | 41 |
| Example 9 | A3 | B1 | 10 | | | D2 | 5 | | | V-0 | 36.4 | 36 |
| Example 10 | A4 | B1 | 5 | C1 | 2 | | | | | V-0 | 34.5 | 45 |
| Example 11 | A4 | B1 | 5 | | | D2 | 2 | | | V-1 | 31.1 | 62 |
| Example 12 | A4 | B1 | 12 | | | D2 | 8 | | | V-0 | 34.5 | 42 |
| Example 13 | A4 | B1 | 5 | C1 | 1 | D2 | 2 | | | V-0 | 34.5 | 55 |
| Comparative Example 12 | A3 | B1 | 5 | | | | | | | V-2 | 28.5 | 85 |
| Comparative Example 13 | A3 | B1 | 15 | | | | | | | V-2 | 30.1 | 79 |
| Comparative Example 14 | A3 | | | C1 | 5 | | | | | V-1 | 24.5 | 92 |
| Comparative Example 15 | A3 | | | | | D2 | 5 | | | V-2 | 25.0 | 72 |
| Comparative Example 16 | A3 | | | | | D2 | 15 | | | V-2 | 25.4 | 85 |
| Comparative Example 17 | A3 | | | | | | | E3 | 38 | V-0 | 38.0 | 412 |
| Comparative Example 18 | A4 | B1 | 7 | | | | | | | Fail | 27.2 | 96 |
| Comparative Example 19 | A4 | | | C1 | 7 | | | | | V-2 | 26.1 | 90 |
| Comparative Example 20 | A4 | | | | | D2 | 7 | | | V-2 | 25.4 | 85 |
| Comparative Example 21 | A4 | | | | | | | E3 | 38 | V-0 | 38.3 | 466 | passing through a 80 mesh sieve were not higher than 20 wt %, is superior to the effect of incorporating the expansive graphite (B2) having an expandability of less than 200 ml/g or the heat-expandable graphite (B3) wherein particles with particle sizes which pass through a 80 mesh sieve exceed 20 wt %, in that a higher level of flame retardancy can be accomplished. Further, it is apparent from comparison between Examples 1 to 4 and Comparative Example 7 that the composition of the present invention is capable of substantially suppressing generation of smoke as compared with the composition having a bromine type flame-retardant incorporated.

Now, the case where the polyethylene terephthalate resin (A2) was used as the polyester resin, will be described. As shown by Examples 5 to 7 and Comparative Examples 8 to 10 in Table 2, synergistic effects are apparent such that a high level of flame retardancy can be accomplished with respect to the polyethylene terephthalate resin by combined use of Components B and C or Components B and D. Further, it is apparent from comparison between Examples 5 and 6 and Comparative Example 11 that the composition of the present invention is capable of remarkably suppressing generation of smoke as compared with the composition having a bromine type flame retardant incorporated.

Firstly, the case where the nylon 6 resin (A3) was used as the polyamide resin (Component A), will be described. As is evident from Comparative Examples 12 and 13, Comparative Example 14 and Comparative Examples 15 and 16 in Table 3, when the heat-expandable graphite (Component B), red phosphorus (Component C) or ammonium polyphosphate (Component D) was used alone, improvement in OI or UL-94 was small. However, as shown in Examples 8 and 9, synergistic effects are apparent such that a high level of flame retardancy can be accomplished with respect to the nylon 6 resin by a combined use of Components B and C or Components B and D. Further, it is clear from comparison between Examples 8 and 9 and Comparative Example 17 that the composition of the present invention is capable of remarkably suppressing emission of smoke as compared with the composition where a bromine type flame retardant was incorporated.

Now, the case wherein the nylon 66 resin (A4) was used as the polyamide resin, will be described. As shown in Examples 10 to 13 and Comparative Examples 18 to 20 in Table 3, synergistic effects are apparent such that a high level of flame retardancy can be accomplished with respect to the nylon 66 resin by combined use of Components B and C, Component B and D, or Components B, C and D. Further, it is evident from comparison between Examples 11 and 12 and Comparative Example 21 that the composition of the present invention is capable of remarkably suppressing emission of smoke as compared with the composition having a bromine type flame retardant incorporated.

EXAMPLES 14 AND 15 AND COMPARATIVE EXAMPLES 22 AND 23

In the cases of the bisphenol A-based polycarbonate resin (A5), materials in the ratio as shown in Table 4 were extrusion-kneaded at 270° C. and injection-molded at 270° C. to obtain a test specimen. In the cases of the polystyrene-modified polyphenylene oxide resin (A6), extrusion-kneading and injection-molding were carried out at 300° C. The flame retardancies and smoke emission levels were measured similarly as above and the results are listed in Table 4.

TABLE 4

| Example No. | A | B | | C | | D | E | | UL 94 | OI | Dmax |
|---|---|---|---|---|---|---|---|---|---|---|---|
| Example 14 | A5 | B1 | 5 | C1 | 5 | | | | V-0 | 42.5 | 314 |
| Example 15 | A6 | B1 | 5 | C1 | 5 | | | | V-0 | 29.0 | 356 |
| Comparative Example 22 | A5 | | | | | | E1 | 20 | V-0 | 31.0 | >500 |
| Comparative Example 23 | A6 | | | | | | E1 | 20 | V-0 | 30.3 | >500 |

These examples illustrate that the present invention affords polycarbonate or modified polyphenylene oxide compositions of high flame retardancy in no way inferior to those containing a bromine type flame retardants. Further, they have much lower smoke emission levels than those of bromine type flame retardants.

What is claimed is:

1. A flame-retardant engineering plastic composition consisting essentially of (A) 100 parts by weight of at least one resin selected from the group consisting of polyester resins, polyamide resins and a polymer alloy of polyphenylene oxide and a thermoplastic or thermosetting resin plastic, (B) from 1 to 30 parts by weight of a heat-expandable graphite, and (C) from 1 to 30 parts by weight of red phosphorus and/or (D) from 1 to 30 parts by weight of a flame retardant phosphorus compound selected from the group consisting of esters of a phosphorus oxyacid, phosphoric acid salts, salts of a phosphoric acid ester and condensed phosphoric acid salts.

2. The flame-retardant engineering plastic composition according to claim 1, wherein the heat-expandable graphite (B) has an expandability at least 100 ml/g which is measured as a difference in the specific volume before and after rapid heating from room temperature to a temperature of 800° to 1,000° C. and the graphite has particle size distribution wherein not more than 20 wt % of the particles pass through a 80 mesh sieve.

3. The flame-retardant engineering plastic composition according to claim 1, wherein the red phosphorus (C) is surface-treated with a compound selected from the group consisting of thermosetting resins and inorganic compounds.

4. A flame-retardant engineering plastic composition consisting essentially of (A) 100 parts by weight of at least one resin selected from the group consisting of polyester resins, polyamide resins and a polymer alloy of polyphenylene oxide and a thermoplastic or thermosetting resin plastic, (B) from 1 to 30 parts by weight of a heat-expandable graphite having an expandability at least 100 ml/g which is measured as a difference in the specific volume before and after rapid heating from room temperature to a temperature of 800° to 1,000° C. and the graphite has particle size distribution wherein not more than 20 wt % of the particles pass through a 80 mesh sieve, and (C) from 1 to 30 parts by weight of red phosphorus surface-treated with a compound selected from the group consisting of thermosetting resins and inorganic compounds and/or (D) from 1 to 30 parts by weight of a flame retardant phosphorus compound selected from the group consisting of esters of a phosphorus oxyacid, phosphoric acid salts, salts of a phosphoric acid ester and condensed phosphoric acid salts.

5. A method of imparting flame-retardancy to an engineering plastic comprising adding to 100 parts by weight of a resin selected from the group consisting of a polyester resin, polyamide resin, polymer alloys of polyphenylene oxide and a thermoplastic or thermosetting resin and mixtures thereof, (B) from 1 to 30 parts by weight of a heat expandable graphite, (C) from 1 to 30 parts by weight of red phosphorus and/or (D) from 1 to 30 parts by weight of a flame retardant phosphorus compound selected from the group consisting of esters of a phosphorus oxyacid, phosphoric acid salts, salts of a phosphoric acid ester and condensed phosphoric acid salts.

6. The method according to claim 5, wherein the heat-expandable graphite (B) has an expandability at least 100 ml/g which is measured as a difference in the specific volume before and after rapid heating from room temperature to a temperature of 800° to 1,000° C. and the graphite has particle size distribution wherein not more than 20 wt % of the particles pass through a 80 mesh sieve.

7. The method according to claim 5, wherein the red phosphorus (C) is surface-treated with a compound selected from the group consisting of thermosetting resins and inorganic compounds.

8. A method of imparting flame-retardancy to an engineering plastic comprising adding to 100 parts by weight of a resin selected from the group consisting of a polyester resin, polyamide resin, polymer alloys of polyphenylene oxide and a thermoplastic or thermosetting resin and mixtures thereof, (B) from 1 to 30 parts by weight of a heat expandable graphite having an expandability at least 100 ml/g which is measured as a difference in the specific volume before and after rapid heating from room temperature to a temperature of 800° to 1,000° C. and the graphite has particle size distribution wherein not more than 20 wt % of the particles pass through a 80 mesh sieve, (C) from 1 to 30 parts by weight of red phosphorus and/or (D) from 1 to 30 parts by weight of a flame retardant phosphorus compound selected from the group consisting of esters of a phosphorus oxyacid, phosphoric acid salts, salts of a phosphoric acid ester and condensed phosphoric acid salts.

* * * * *